United States Patent

Kliman et al.

Patent Number: 5,828,210
Date of Patent: Oct. 27, 1998

[54] X-RAY TUBE ANODE DRIVE SPEED MONITOR INCLUDING FLUX PICKUP COIL

[75] Inventors: Gerald Burt Kliman; Rudolph Alfred Albert Koegl, both of Niskayuna, N.Y.; Steven Duane Hansen, Port Washington, Wis.

[73] Assignee: General Electric Company, Schenectady, N.Y.

[21] Appl. No.: 702,375

[22] Filed: Aug. 23, 1996

[51] Int. Cl.[6] .................................. G01P 3/48; G01P 3/54
[52] U.S. Cl. ..................... 324/173; 324/160; 324/163; 378/94
[58] Field of Search ..................... 324/160, 163, 324/164, 166, 167, 173, 177, 207.25, 207.22, 226, 772; 378/94; 336/222, 225

[56] References Cited

U.S. PATENT DOCUMENTS

| 534,596 | 1/1895 | Atwood et al. ..................... 336/222 |
| 3,943,356 | 3/1976 | Schmutzer ........................ 250/406 |
| 4,761,703 | 8/1988 | Kliman et al. . |
| 4,839,585 | 6/1989 | Bicknell .......................... 324/258 |
| 5,049,815 | 9/1991 | Kliman . |
| 5,530,343 | 6/1996 | Bowers, III et al. ............... 324/160 |

OTHER PUBLICATIONS

"Condition Monitoring of Electrical Drives" by J. Penman, et al, Paper 4512FB (P1,S6), Nov. 1985, 4 Pages.
"Leakage Field Changes of an Induction Motor as Indication of Nonsymmetric Supply" by MS Erlicki, et al, IEEE Transactions on Inedustry & Gen. Applications, vol. IGA–7, No. 6 Nov. 12, 1971 pp. 713–717.

*Primary Examiner*—Walter E. Snow
*Attorney, Agent, or Firm*—Ann M. Agosti; Marvin Snyder

[57] ABSTRACT

A method for monitoring a rotor speed of an X-ray tube anode drive includes acquiring axial flux pickup data from the rotor, using the axial flux pickup data to provide a flux spectrum, and estimating the rotor speed by analyzing the flux spectrum. The step of acquiring axial flux pickup data can include situating an axial leakage flux pickup coil so as to pick up a flux signal from an X-ray tube anode drive rotor while the rotor rotates. An analog flux signal can be converted to a digital flux signal and a fast Fourier transform can be used to transform the digital flux signal into a flux spectrum. The flux spectrum can be used to estimate a drive frequency and a slip frequency and the speed can be estimated by subtracting the slip frequency from the drive frequency and dividing by the number of pole pairs of the X-ray tube anode drive.

12 Claims, 6 Drawing Sheets

X-RAY TUBE ANODE DRIVE SPEED MONITOR INCLUDING FLUX PICKUP COIL

BACKGROUND OF THE INVENTION

Motor bearings require more drive torque as degradation occurs, and motor speed is thus reduced. Motor speed can therefore be used to indicate bearing condition.

X-ray anodes generally operate at high temperatures in excess of 1000° C., for example. The rotor of an X-ray tube anode drive motor also operates at a high temperature on the order of 700° C., for example. Both the anode and the rotor are at voltage levels in the kilovolt range (often about seventy five kilovolts), are operated under high vacuum conditions, and are situated in an intense radiation field.

Although various attempts have been made to mechanically measure X-ray anode speed, practical instrumentation has not been developed. For example, optical sensors have been used, but limitations have arisen because of the bright background of the anode, the lack of contrasting reflectivity at high temperatures, the hot oil which surrounds the insert, the difficulty of gaining access to the rotor through the high voltage shield, the difficulty of coupling to and through the glass envelope, and the rapid degradation (caused by radiation) of optical components.

Coaxial coils have been used on industrial motors as "lost phase" detectors, broken rotor bar detectors, and sensors to diagnose motor faults as described in Kliman et al., U.S. Pat. No. 4,761,703, issued Aug. 2, 1988; J. Penman et al., "Condition monitoring of electrical drives," IEE Proceedings, Vol. 133, Part B, No. 3, May 1986; and M. S. Erlicki et al., "Leakage Field Changes of an Induction Motor as Indication of Nonsymmetric Supply," IEEE Transactions on Industry and General Applications, vol. IGA-7, no. 6, November/December 1971, for example.

SUMMARY OF THE INVENTION

It would be desirable to have an inexpensive reliable technique of measuring speed during factory seasoning of X-ray tube inserts, as well as having a monitor for convenient addition to existing X-Ray units at customer sites for in situ monitoring of bearing health to provide advance warning of degradation and thereby prevent catastrophic X-ray tube failures from occurring during patient treatments.

The present invention is a speed monitor for an X-ray tube anode drive which calculates the X-ray motor's speed using slip frequency determined by examining the motor stray flux signatures from an axial leakage flux pickup coil (hereinafter referred to as a coil) which is preferably situated coaxial to the motor shaft on the mounting basket. The voltage induced on the coil will include strong spectral components at line frequency and slip frequency, and the coil can be used either as a product retrofit addition or as a factory test device.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION OF A PREFERRED EMBODIMENT OF THE INVENTION

Figure 1:
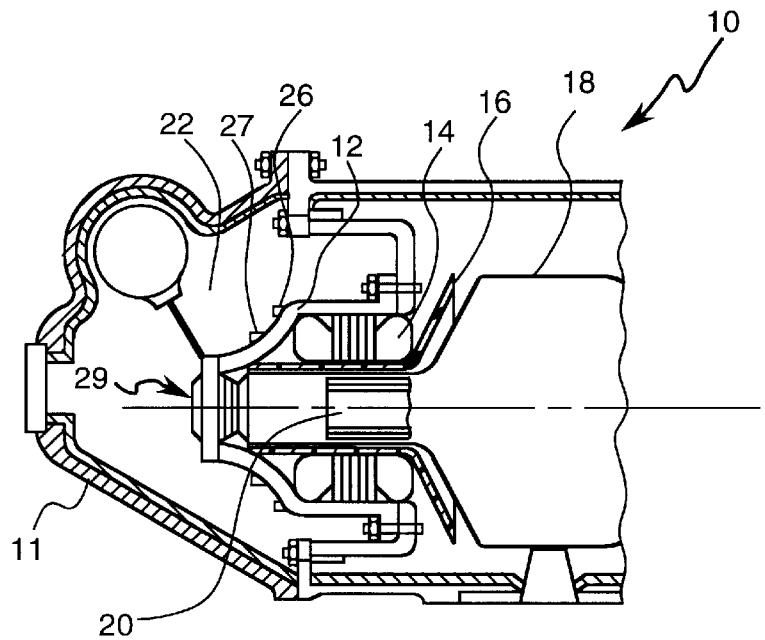
FIG. 1 is a sectional side view of an X-ray tube having an insert with an anode drive motor assembly including a speed monitor of the present invention.
Figure 2:
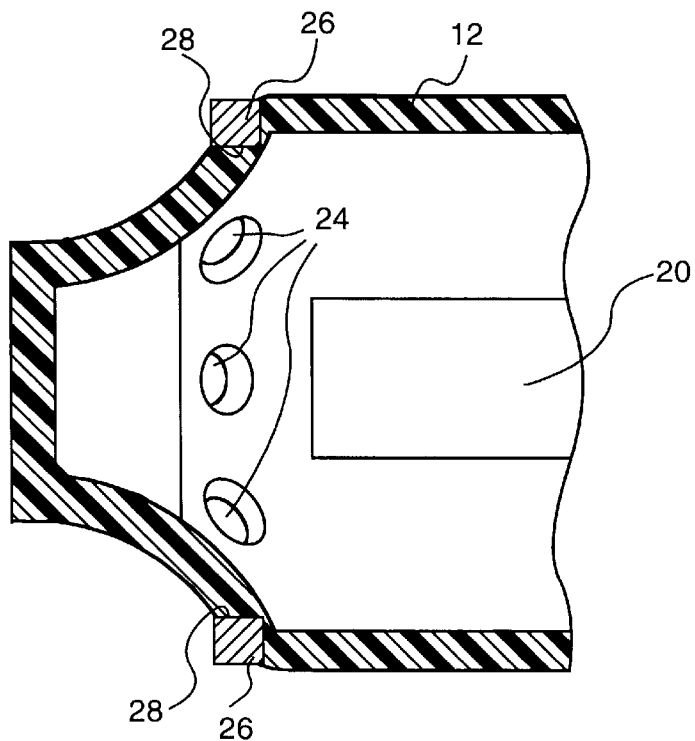
FIG. 2 is a sectional side view showing a stator basket of FIG. 1 in further detail.

FIG. 1 is a sectional side view of an X-ray tube 10 including a housing 11, an insert 18 (a glass vacuum envelope), and an anode drive motor assembly having a speed monitor including a coil 26. FIG. 2 illustrates the placement of coil 26 of the present invention in further detail. The X-ray tube includes a stator support basket 12, a stator 14, a high voltage shield 16, insert 18, and a rotor 20.

Rotor 20 typically comprises a copper and steel sheet rotor. Stator 14 may comprise a material such as steel laminations with insulated copper wire windings, and stator support basket 12 may comprise a material such as a plastic. In one embodiment, the high voltage shield comprises a plastic.

In one embodiment, the stator core is held at ground potential while the rotor is at a potential of about seventy-five kilovolts. The rotor can operate at a temperature of about 700° C. and spin at about 10,800 RPM (revolutions per minute), for example. The motor can be cooled and insulated by being immersed in a dielectric oil 22 that can have a temperature as high as 100° C. and that can be pumped through stator support basket 12 via access holes 24 (shown in FIG. 2) to the stator.

Coil 26 may comprise a coil of several hundred turns of insulated wire. In one embodiment coil 26 is a round coil coaxial to the rotor shaft. Coil 26 can have any desired shape, however and need not be coaxial to the shaft so long as the coil is situated such that sufficient flux can be picked up for an adequate reading. In one embodiment, the insulated wire comprises enamel-insulated copper. In another embodiment, the coil comprises insulated carbon fibers which have a high resistance for current limiting and are therefore useful in high voltage environments.

Coil 26 can be wound into a recess 28 which has been cut or molded, for example, into stator support basket 12. The preferred location of the recess is above access holes 24. The coil can be wound using a lathe or similar such winding tool. The coil is highly reliable and does not suffer degradation by the environment any faster than the motor itself suffers degradation. In fact, because of the low impressed voltage and lack of sharp bends and stresses, the coils are expected to last longer than their respective motors.

A coil positioned as shown in FIG. 2 has a signal induced therein which includes strong components at the fundamental frequency of the stator current and strong components of the rotor current at slip frequency. For two pole motors, the stator current is at the drive frequency (Fs in hertz (cycles per second)), the rotor current is at the slip frequency (Fr in hertz), and the slip frequency is the difference between the synchronous speed of the stator and the mechanical speed of the rotor. Because these frequency components are easily measured by a fast fourier transform spectrum analyzer, for example, they provide a convenient method for calculating the speed (N in RPM) with the following equation:

$$N=(Fs-Fr)*60/P,$$

wherein P represents the number of pole pairs in the motor. The number 60 represents 60 seconds per minute and is used for unit conversion purposes.

In an optional embodiment, a guard ring 27 (shown in FIG. 1) is added around a portion of the stator basket situated between a high voltage connection 29 and coil 26. The guard ring comprises a conductive material which, in one embodiment is coupled to ground (open) for the purpose of diverting any voltage that might leak from the high voltage connection. In another embodiment, the guard ring has its two ends coupled together (closed) and, in addition to being capable of diverting voltage leaking from the high voltage connection, can suppress transient electromagnetic fields from sources such as, for example, arcs creating high voltage discharges in the X-ray tube.

Figure 3:
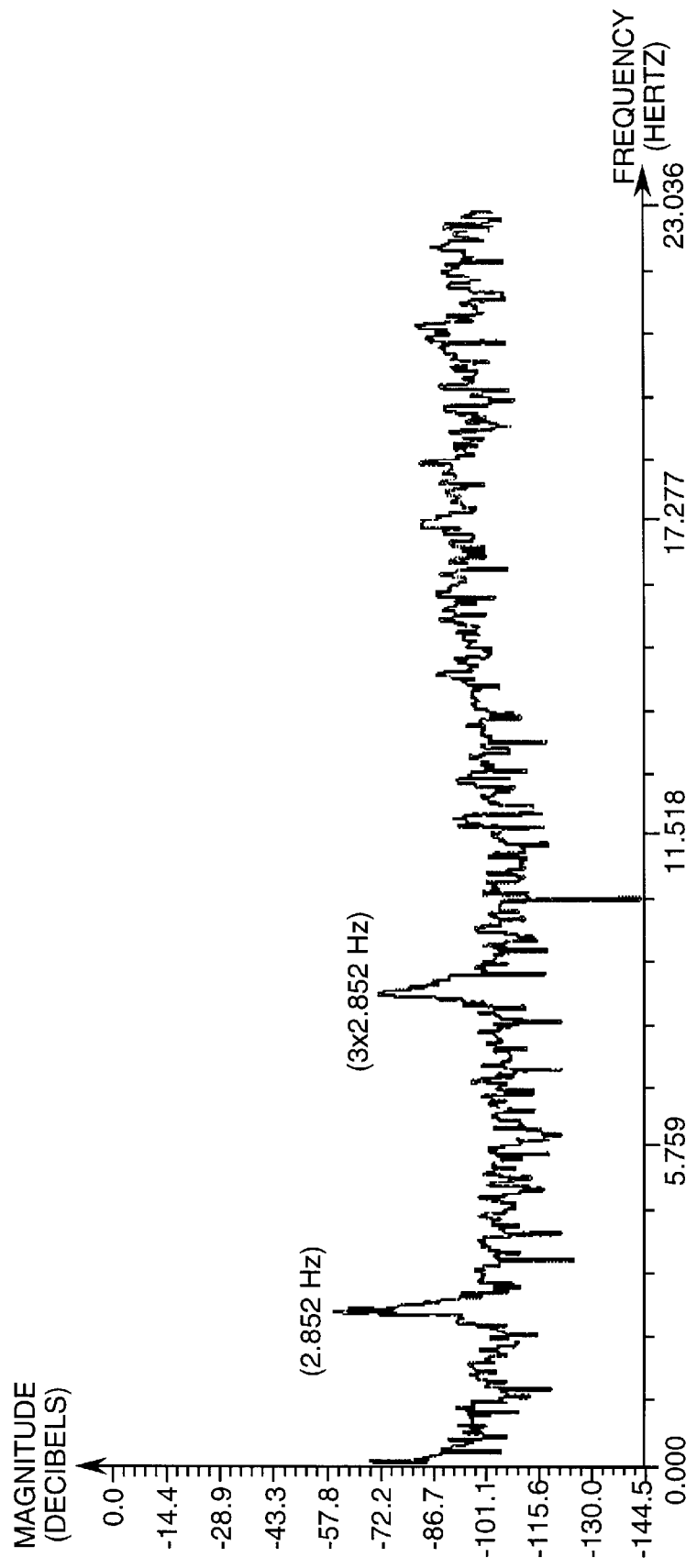
FIG. 3 is a graph illustrating power spectrum of the speed monitor for signals present in a slip frequency range.
Figure 4:
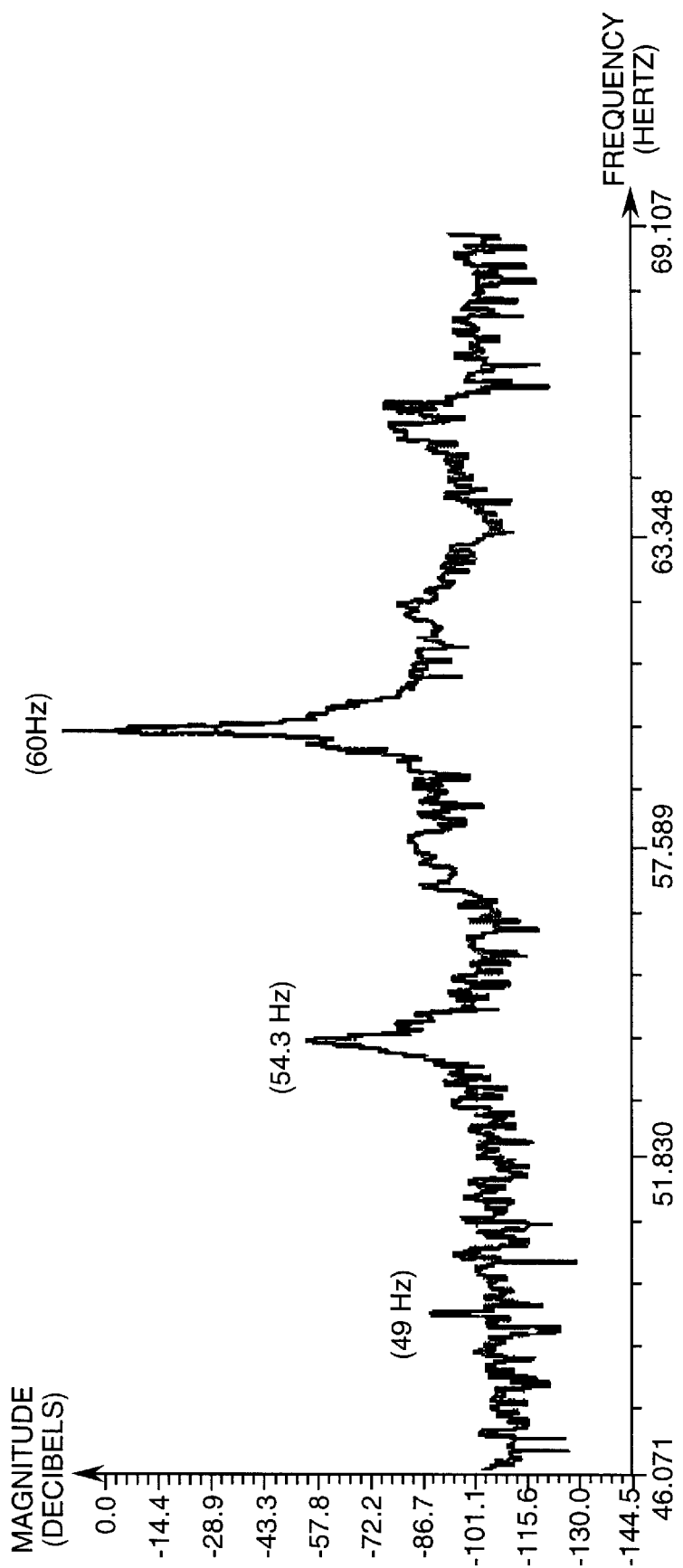
FIG. 4 is a graph illustrating power spectrum of the speed monitor for a frequency spectrum near the drive frequency.

FIG. 3 is a graph illustrating power spectrum of the speed monitor for signals present in a slip frequency range, and FIG. 4 is a graph illustrating power spectrum of the speed monitor for a frequency spectrum near the drive frequency. The rotor frequency signal originates in slight electromagnetic asymmetries of the rotor which are always present due to manufacturing tolerances. These asymmetries are large in anode drive motors because of the mechanical balancing process which requires holes to be drilled in the copper and steel sheets of the rotor. The signals can be obtained through a coaxially mounted flux pick-up coil which, in one embodiment, has a 10 Kohm termination for each channel.

The frequency measured by coil 26 will include the rotor frequency and the line frequency as well as other components. Usually the rotor frequency will appear well defined and in isolation. When the motor is loaded there will also be rotor frequency related signals in the stator current and coil voltage. These will appear as sidebands of the fundamental line frequency and be spaced at twice the rotor frequency away. Usually there is both an upper and a lower sideband. For high inertia loads, only the lower sideband may appear in some cases. Also the signal-to-noise ratio in the current may be quite poor at low loads.

In FIG. 3 a well defined peak is found at 2.852 hertz (the slip frequency) corresponding to 3428 RPM with a 60 hertz line frequency. The speed monitor on the dynamometer read 3430 RPM at approximately the same time that the data was acquired. The difference between the speed measurement via the axial flux sensor frequency and the dynamometer readout is a combination of FFT (fast Fourier transform) resolution (bin width) and the 60 pulse/revolution magnetic speed sensor in the dynamometer. The peak is narrow and well isolated with no other nearby peaks and is about 40 db above the background noise. The second, smaller peak is actually a third harmonic. A weak eighth harmonic and some other weak signals (not shown) appear at 38.00 and 41.67 hertz and may be related to the dynamometer or suspension system. As shown in FIG. 4, there is a large peak (the drive frequency) at 60 hertz with sidebands at multiples of twice the rotor slip frequency (2×2.852 hertz).

Figure 5:
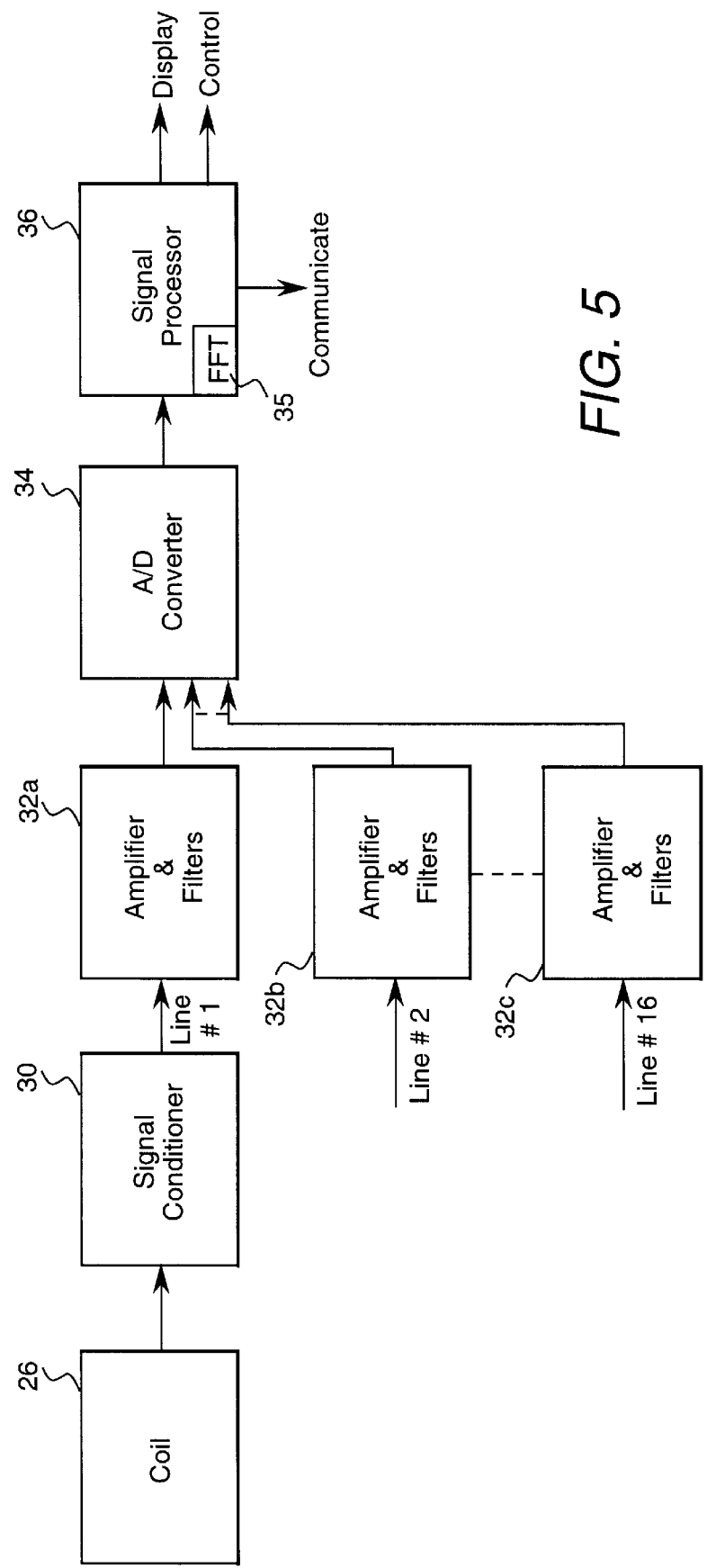
FIG. 5 is a block diagram of a data acquisition system of the present invention.

FIG. 5 is a block diagram of a data acquisition system of the present invention including a signal conditioner 30, amplifier and filters 32a, 32b, and 32c, an analog-to-digital (A/D) converter 34, and a signal processor 36 which includes a fast Fourier transform (FFT) 35.

Figure 6:
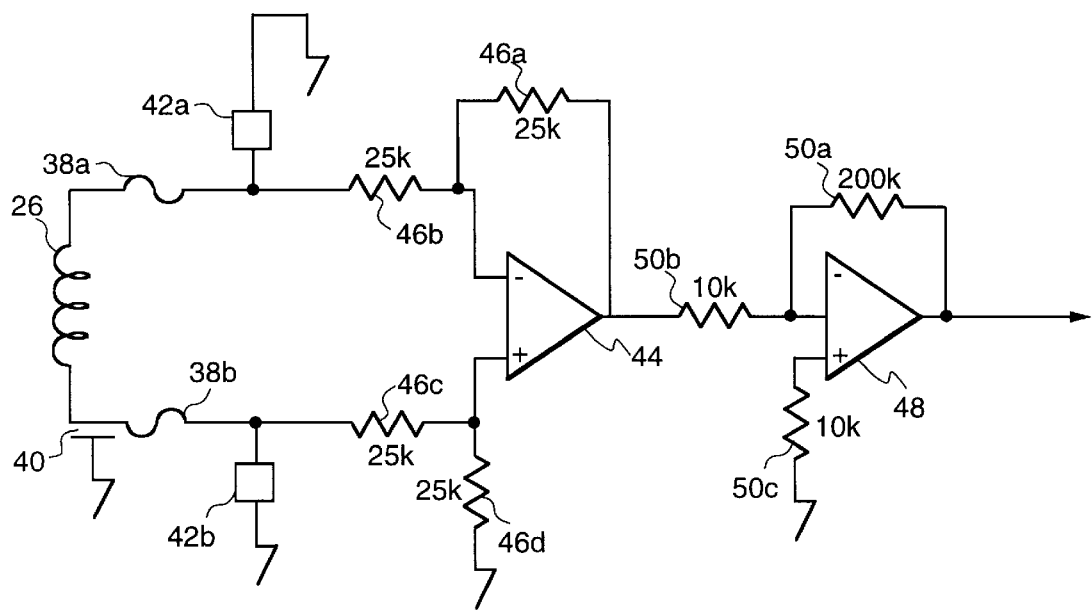
FIG. 6 is a circuit diagram of a signal conditioner useful in the data acquisition system shown in FIG. 5.

Signal conditioner 30 is more particularly illustrated by the circuit diagram of FIG. 6. High voltage protection is provided by fuses 38a and 38b, spark gap 40, and MOV (metal oxide varistor) voltage limiters 42a and 42b. The voltage limiters guard against over voltages due to possible leakage of the high voltage across the basket which occurs if the basket becomes contaminated. The voltage limiters also protect against excess signals resulting from spits (intermittent high voltage discharges). A differential instrumentation amplifier 44, along with resistors 46a, 46b, 46c, and 46d of signal conditioner 30, increases the signal level. A preamplifier 48, along with resistors 50a, 50b, and 50c, allows signal levels to be boosted to an optimum level and serves as a line driver for transmission from the motor to the signal processing equipment.

Referring to FIG. 5, amplifier and filter 32a, 32b, and 32c of FIG. 5 may comprise, for example, an RC Electronics (Santa Barbara, Calif.) Programmable Gain and Filter Module set configured for a Bessel Filter with DC to 400 hertz response and a gain of 40. Preferably the filter is an anti-aliasing filter. Amplifier 48 provides additional amplification (with adjustable gain), if needed, to drive A/D converter 34. Examples of anti-aliasing filters include 8 pole Elliptic and Chebychev filters.

A/D converter 34 can be hard configured for simultaneous sample and hold differential inputs or may comprise a multiplexed sample and hold A/D that is capable of being configured for use with single ended or differential channel inputs, for example. The A/D converter supplies the resulting digital signal to signal processor 36. If desired, the amplifier and filters 32a, 32b, and 32c, A/D converter 34, and signal processor 36 can be replaced by digital or analog packaged frequency analyzers (not shown).

Signal processor 36 may comprise a general or specialized microcomputer, for example. The signal processor can include software to perform the functions of data collection, spectrum formation, spectrum analysis, and rotor speed reporting.

Figure 7:
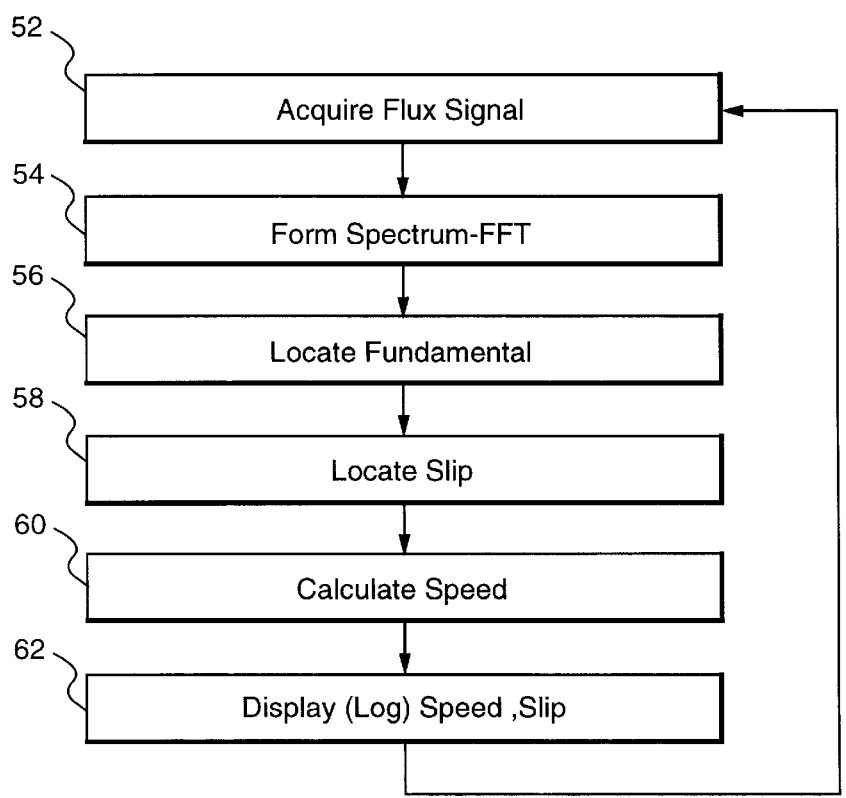
FIG. 7 is a flow chart of data processing steps of the present invention.

FIG. 7 is a flow chart of data processing steps of the present invention. At step 52, the flux signal is acquired from A/D converter 34 of FIG. 5, and at step 54, a fast fourier transform is performed on the flux signal to provide a flux spectrum graph of the type shown in FIGS. 3 and 4.

At step 56, the fundamental power source frequency (drive frequency Fs) is located within the flux spectrum. In some systems the motor drive frequency will be available from a master oscillator, and the axial flux sensors are thus not needed for determining Fs. For systems wherein the drive frequency is not readily available from a master oscillator, one of several techniques can be used to estimate Fs. In one approach, the largest signal in the frequency spectrum is identified and used as the drive frequency. In a more refined alternative, if an approximate value of the line frequency (60 hertz for on-line conditions or 180 hertz for an inverter, for example) is known, a window around the approximate frequency can be searched with the largest signal being used to locate Fs.

At step 58, the slip frequency (Fr) is located using the frequency spectrum. For most motors, the region in the frequency spectrum wherein slip occurs can be predicted from the motor design parameters. In one embodiment, such a region includes 0 to 4 hertz, for example, and the slip frequency is determined by looking for the highest peak from 4 hertz towards 0 hertz.

In another embodiment, the slip frequency is determined by evaluating frequency peaks over a wider frequency range. First the lowest peak (a peak having the lowest frequency of any of the other peaks) is found. Then the next lowest peak is found and it is determined whether the next lowest peak is an integer multiple of the lowest peak. If the answer is yes, then that next lowest peak is a harmonic of the lowest peak, and the lowest peak is representative of slip frequency.

At step 60, the rotor speed is calculated using the above equation (Fs−Fr)*60/P. Experimentation can be used to determine what speed is representative of poor bearing condition. A user monitoring the X-ray tube can shut down the unit upon reaching a given speed or the unit can be programmed to turn itself off via a control output signal from signal processor 36, for example.

Figure 8:
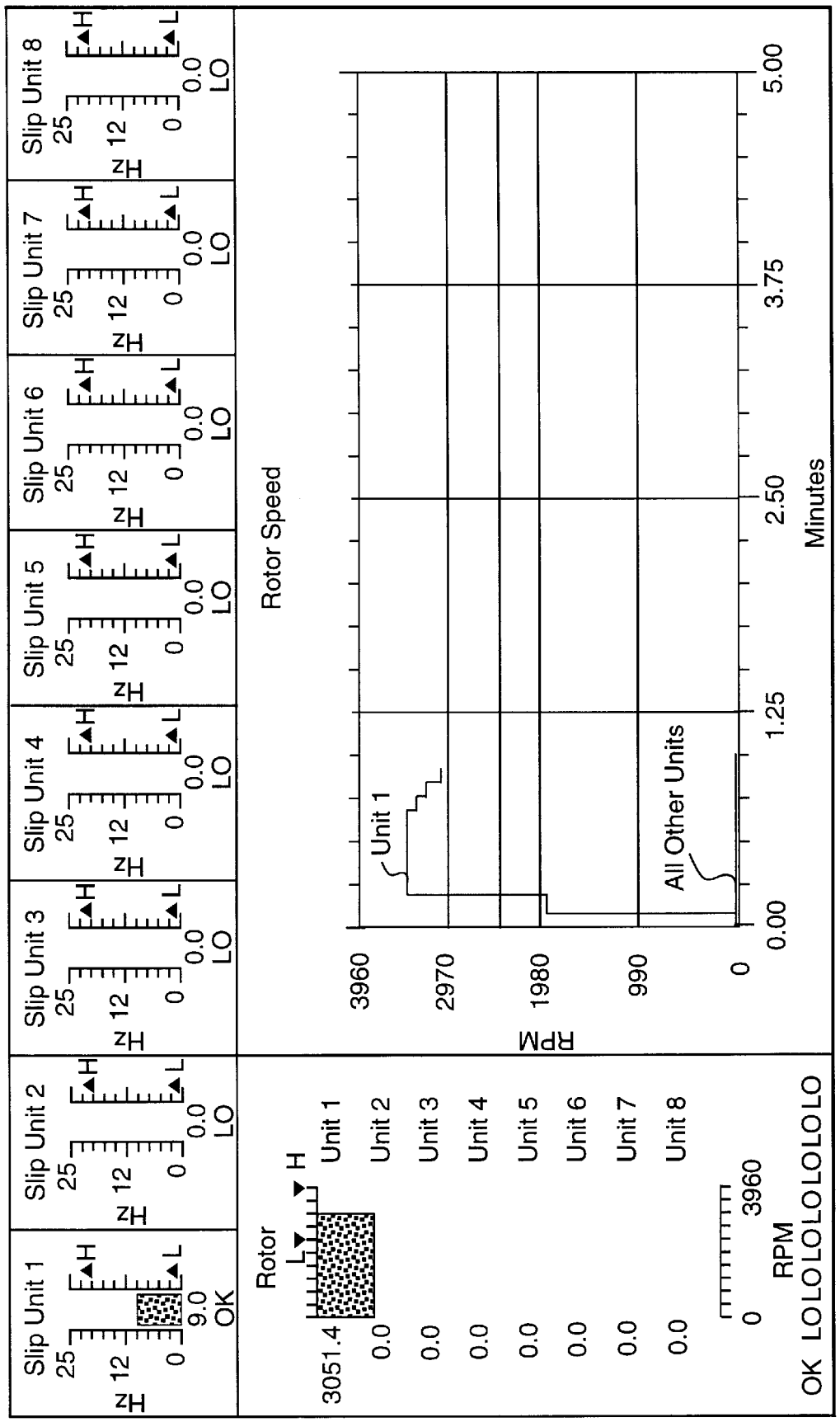
FIG. 8 is an example of a screen display wherein slip and speed are simultaneously monitored for eight inserts.

FIG. 8 is an example of a screen display wherein slip and speed are simultaneously monitored for eight inserts. If the present invention is used as a factory tool for monitoring the insert seasoning tanks, a multiple display reporting system is desirable for accommodating a number of inserts simultaneously. The present state for each insert can be displayed and the trend for each insert can be stored and displayed on command.

It is useful to communicate the principle results back to the process control and overall monitoring system. Such a system has been implemented based on a PC compatible computer with standard components. Operator visual alarm levels can be programmable for each bar graph.

A complete disposition cycle can be run over approximately six seconds, permitting 10 measurements per minute (based on a 1009.69 hertz sample rate, 4096 point fast Fourier transform, data acquisition of 8 X-ray units, and IBM PC compatible 486 66 megahertz implementation architecture using RAM based files). Each unit's time sequence data can be extracted and a power spectrum can be formed with 0.25 hertz resolution.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A speed monitor for an X-ray tube anode drive including a rotor, a stator, and a stator support basket, the speed monitor comprising:

an axial leakage flux pickup coil situated on the stator support basket so as to pick up a flux signal from the rotor while the rotor rotates;

an electrically conductive guard ring situated on the stator support basket between a high voltage contact and the coil; and a signal processor for using the flux signal to estimate a speed of the rotor.

2. The speed monitor of claim 1, wherein the axial leakage flux pickup coil is situated so as to pick up an analog flux signal from the rotor.

3. The speed monitor of claim 2, further including an analog to digital converter for converting the analog flux signal to a digital flux signal and wherein the signal processor includes a fast Fourier transform for transforming the digital flux signal into a flux spectrum.

4. The speed monitor of claim 1, wherein the coil is situated coaxial to the rotor.

5. A method for monitoring a rotor speed of an X-ray tube anode drive, the method comprising:

acquiring axial flux pickup data from the rotor from an axial leakage flux pickup coil situated on a stator support basket so as to pick up a flux signal from the rotor while the rotor rotates, the stator support basket including an electrically conductive guard ring between a high voltage contact and the coil;

using the axial flux pickup data to provide a flux spectrum; and estimating the rotor speed by analyzing the flux spectrum.

6. The method of claim 5, wherein the steps of acquiring axial flux pickup data and using the axial flux pickup data to provide a flux spectrum include situating an axial leakage flux pickup coil so as to pick up an analog flux signal from the rotor while the rotor rotates, converting the analog flux signal to a digital flux signal, and using a fast Fourier transform for transforming the digital flux signal into a flux spectrum.

7. The method of claim 6, wherein the step of estimating the rotor speed by analyzing the flux spectrum includes estimating a drive frequency, using the flux spectrum to estimate a slip frequency, subtracting the slip frequency from the drive frequency, and dividing by a number of pole pairs of the X-ray tube anode drive.

8. The method of claim 7, wherein the step of using the flux spectrum to estimate a slip frequency includes, within a predetermined frequency range, obtaining a frequency value at which a highest peak exists.

9. A method for monitoring a rotor speed of an X-ray tube anode drive, the method comprising:

situating an axial leakage flux pickup coil so as to pick up an analog flux signal from the rotor while the rotor rotates;

converting the analog flux signal to a digital flux signal;

using a fast Fourier transform for transforming the digital flux signal into a flux spectrum; and estimating the rotor speed by estimating a drive frequency, using the flux spectrum to estimate a slip frequency by obtaining a lowest frequency value both at which a peak exists and that is a multiple of a next lowest frequency value at which an other peak exists, subtracting the slip frequency from the drive frequency, and dividing by a number of pole pairs of the X-ray tube anode drive.

10. The method of claim 7, wherein the step of estimating the drive frequency includes obtaining the frequency value at which the highest peak in the frequency spectrum exists.

11. The method of claim 5, wherein the step of estimating the drive frequency includes estimating the approximate frequency value at which a highest peak in the frequency spectrum exists and obtaining, within a window including the approximate frequency value, a frequency value at which a highest peak exists.

12. A speed monitor for an X-ray tube anode drive including a rotor, a stator, and a stator support basket, the speed monitor comprising:

an axial leakage flux pickup coil situated on the stator support basket so as to pick up a flux signal from the rotor while the rotor rotates, the coil comprising insulated carbon fibers;

a high voltage protection component comprising an electrically conductive guard ring situated on the stator support basket between a high voltage contact and the coil; and a signal processor for using the flux signal to estimate a speed of the rotor.

* * * * *